United States Patent

Kim

[11] Patent Number: 6,134,086
[45] Date of Patent: Oct. 17, 2000

[54] ACTUATOR CRASH STOPPER FOR A HARD DISK DRIVE

[75] Inventor: Myung-Il Kim, Gumi, Rep. of Korea

[73] Assignee: SamSung Electronics Co., Ltd., Suwon, Rep. of Korea

[21] Appl. No.: 09/060,996

[22] Filed: Apr. 16, 1998

[30] Foreign Application Priority Data

Apr. 24, 1997 [KR] Rep. of Korea .......... 97-15332

[51] Int. Cl.$^7$ .................. G11B 5/54; G11B 21/22
[52] U.S. Cl. ........................................... 360/256
[58] Field of Search .................. 360/104, 105, 360/106, 109, 256, 256.1, 256.2, 256.3, 256.4, 256.5

[56] References Cited

U.S. PATENT DOCUMENTS

| | | | |
|---|---|---|---|
| 4,110,802 | 8/1978 | Ho et al. | 360/106 |
| 4,439,792 | 3/1984 | Van De Bult | 360/106 |
| 4,939,611 | 7/1990 | Connolly | 360/128 |
| 5,034,837 | 7/1991 | Schmitz | 360/105 |
| 5,187,627 | 2/1993 | Hickox et al. | 360/105 |
| 5,208,713 | 5/1993 | Lindsay et al. | 360/105 |
| 5,227,936 | 7/1993 | Strickler et al. | 360/97.02 |
| 5,231,556 | 7/1993 | Blanks | 360/105 |
| 5,313,354 | 5/1994 | Sampietro et al. | 360/105 |
| 5,329,412 | 7/1994 | Stefansky | 360/97.01 |
| 5,365,389 | 11/1994 | Jabbari et al. | 360/105 |
| 5,404,257 | 4/1995 | Alt | 360/105 |
| 5,477,403 | 12/1995 | Strickler | 360/105 |
| 5,543,986 | 8/1996 | Albrecht | 360/105 |
| 5,612,842 | 3/1997 | Hickox et al. | 360/105 |
| 5,712,750 | 1/1998 | Kim | 360/105 |
| 5,768,058 | 6/1998 | Hofland | 360/105 |
| 5,793,572 | 8/1998 | Lalouette et al. | 360/105 |

*Primary Examiner*—David L. Ometz
*Attorney, Agent, or Firm*—Robert E. Bushnell, Esq.

[57] ABSTRACT

An actuator crash stopper of the hard disk drive having a base for mounting all the components of the hard disk drive. An actuator stopper is provided on one side of the actuator adjacent to the pivot of the actuator so as to act as an inner and outer crash stopper at both inner and outer rotation limits of the actuator, thereby preventing the actuator from being rotated beyond the limits. A stopper guide is vertically fixed on the base so as to be engaged with the actuator stopper at the limits when the actuator rotates on the pivot.

13 Claims, 6 Drawing Sheets

ACTUATOR CRASH STOPPER FOR A HARD DISK DRIVE

CLAIM OF PRIORITY

This application makes reference to, incorporates the same herein, and claims all benefits accruing under 35 U.S.C. § 119 from an application entitled *Actuator Crash Stopper Of Hard Disk Drive* earlier filed in the Korean Industrial Property Office on Apr. 24, 1997, and there duly assigned Serial No. 97-15332 by that Office.

BACKGROUND OF THE INVENTION

1. Field of the Invention

The present invention relates to a hard disk drive, and more particularly to an actuator crash stopper in a hard disk drive.

2. Description of the Related Art

Generally, the hard disk drive is a magnetic storage device consisting of electronic and mechanical devices, which converts the digital electrical pulse into permanent magnetic field so as to record data on the disk surface.

A typical hard disk drive suitable for use with a microcomputer or CPU (Central Processing Unit), is constructed with a generally, rectangularly shaped base serving as a frame providing a major interior surface accommodating a plurality of circular disks coaxially mounted in a stack upon a spindle driven by a motor mounted on the base to provide a plurality of cylindrical base surfaces that serve as a memory into which binary information may be written and read. An actuator, mounted upon the base by a pivot, freely rotates about the longitudinal axis of the pivot as controlled by a voice coil motor positioned to respond to electrical control signals and thereby arcuately displace a proximal end of the actuator arm. The actuator arm supports a head gimbal at its distal end which, in turn, supports a plurality of electromagnetic transducers commonly known as read/write actuator heads for reading and writing data on the disks. A PCBA (Printed Circuit Board Assembly) controls the disk drive components, and an interface is connected between the disk drive and the CPU. Typically, the base surfaces of the disks are coated with a magnetically sensitive material that responds to fields created by corresponding ones of the heads, to enable the heads to either write bits of information at selected locations along tracks formed on the surface of the disk, or to read information from those tracks. Generally, the disks continuously rotate in a single direction while the voice coil motor acts upon the proximal end of the actuator arm to arcuately displace the proximal end relative to the motor and thereby cause the distal ends of the actuator arm to radially position the heads along corresponding base surfaces of the disks to read or write data thereto.

The actuator heads "fly" over the corresponding base surfaces of the disks, and are normally spaced apart from those surfaces by a hydrodynamic air bearing formed by a cushion of air generated by the rapid rotation of the disks. The voice coil motor drives the proximal end of the actuator arm to move the heads to a data free parking or landing zone of the disks upon which the heads may rest without destroying information stored on the disks, when electrical power is turned off. Typically, the actuator arm quickly moves the heads to the parking zone in case of error or loss of power, and generally a crash stop is provided to block the proximal end and thereby limit further movement of the actuator arm once the heads reach their stop position within the parking zone. Examples of hard disk drives having crash stops are U.S. Pat. No. 5,187,627 to Thomas A Hickox et al. entitled *Magnetic Latch And Crash Stop*; U.S. Pat. No. 5,365,389 to Iraj Jabbari et al. entitled *Crash Stop And Magnetic Latch For Optimum Use Of Disc Space*; and U.S. Pat. No. 5,712,750 to Youn-Tai Kim entitled *Actuator Fixing Device Of Hard Disk Drive*.

SUMMARY OF THE INVENTION

Accordingly, it is an object of the present invention to provide a crash stopper capable of protecting the heads against an outer crash by minimizing the impact force incurred when the actuator voice coil motor of the hard disk drive collides against a damper and substituting for the functions of the conventional damper and latch magnet.

According to the present invention, an actuator crash stopper of the hard disk drive comprises a base for mounting all the components of the hard disk drive, an actuator stopper provided on one side of the actuator adjacent to the pivot of the actuator so as to act as the inner and outer crash stopper at both inner and outer limits, thereby preventing the actuator from being rotated beyond the limits, and a stopper guide pin vertically fixed on the base so as to be engaged with the actuator stopper at the limits when the actuator rotates on the pivot.

The present invention will now be described more specifically with reference to the drawings attached only by way of example. It is to be noted that like reference numerals and characters used in the accompanying drawings refer to like constituent elements throughout all drawings. Besides, in order to more clarify the inventive concept, the general functions and structure of the conventional parts are omitted in the following description.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
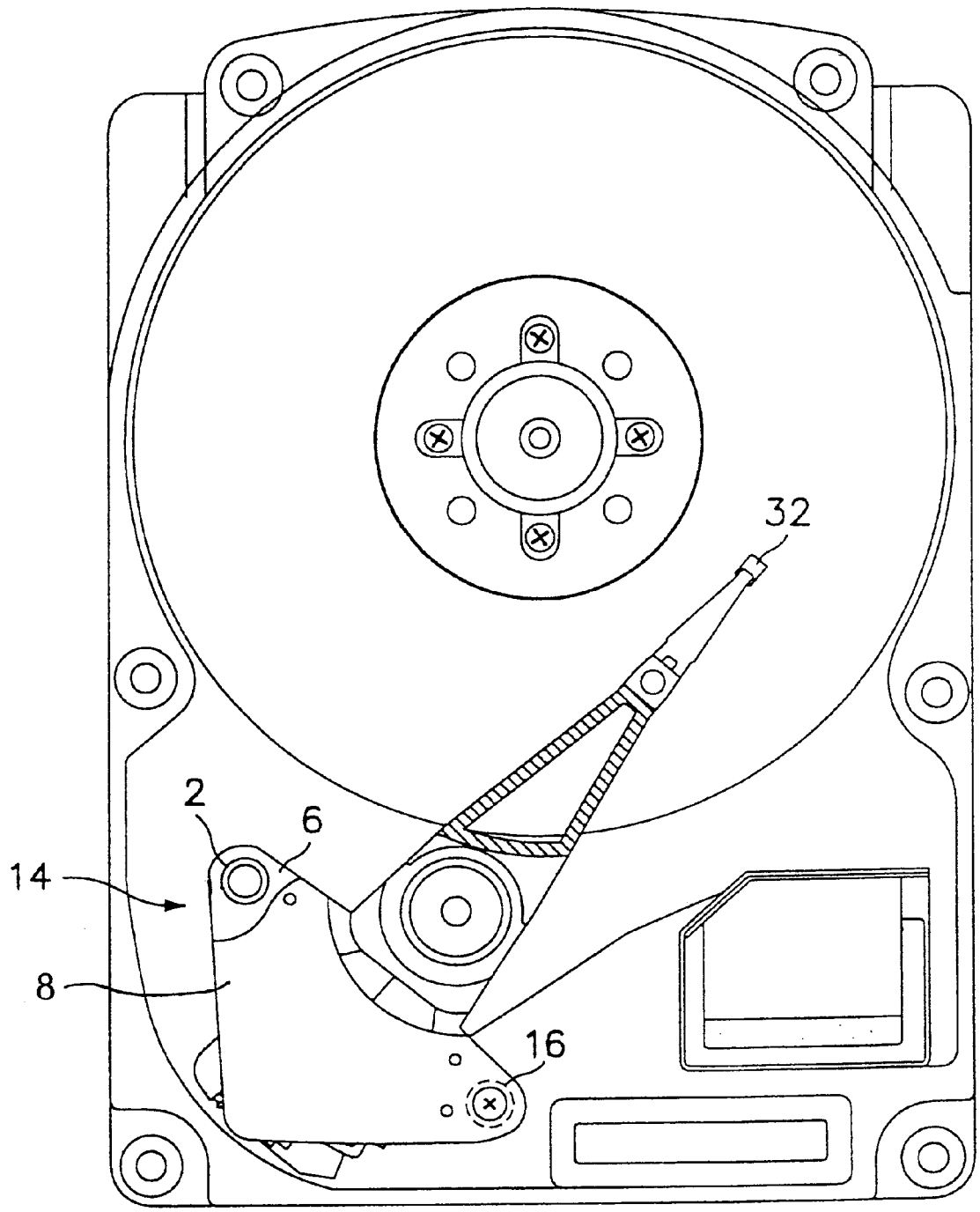
FIG. 1 is a schematic plan view of a hypothetical typical hard disk drive provided with a crash stopper.
Figure 2:
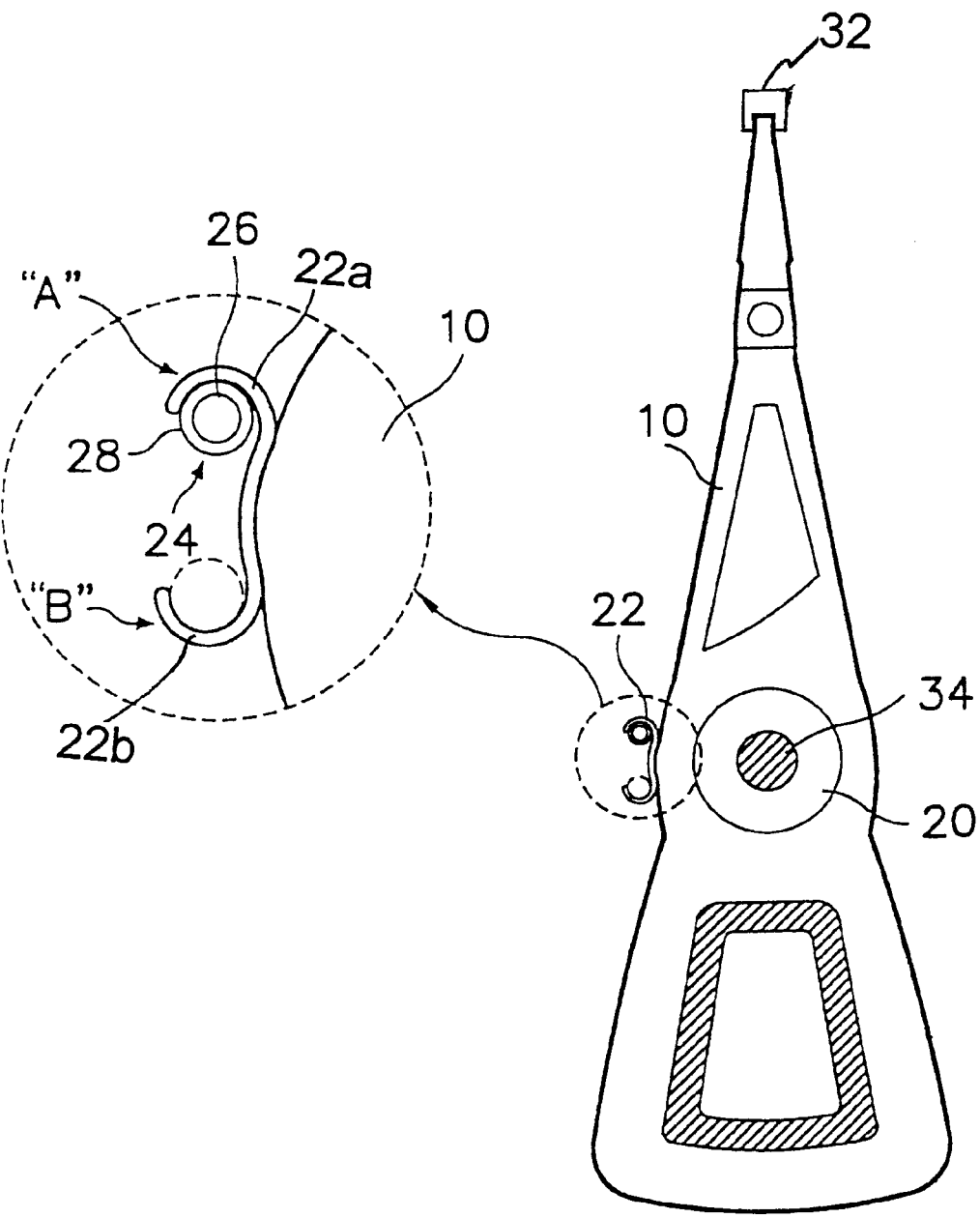
FIG. 2 is a diagram for illustrating an actuator provided with a stopper according to a preferred embodiment of the present invention.
Figure 3:
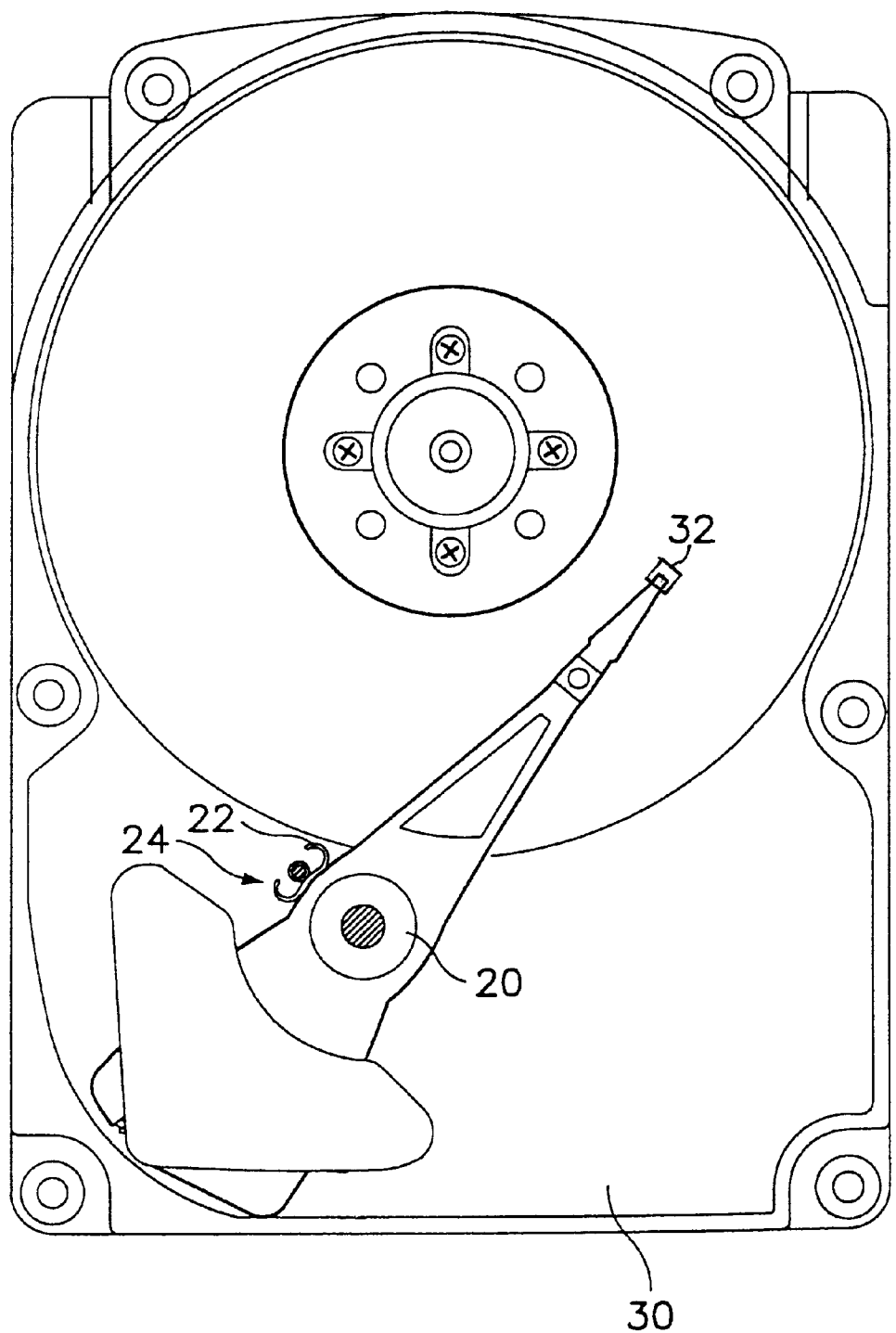
FIG. 3 is a schematic plan view for illustrating a hard disk drive with an actuator provided with a stopper as shown in FIG. 2 according to the preferred embodiment of the present invention.

Referring to FIG. 1, the crash stopper is structured so as to simply set the parking zone and the outer limit of data zone in association with supplementary devices such as damper or magnet latch. That is, an outer crash stop 14 serves not only as a reference position to guide heads onto a first track but also as a shock absorber by means of a damper, i.e., O-ring 2, when heads receive abnormal impact. An inner crash stop 16 is a magnetic latch mechanism to protect heads 32 against excessive movement exceeding the inner limit on disk surfaces so as to prevent the heads from being damaged during a parking operation. A lower yoke 6 and a upper yoke 8 cover a portion of an actuator 10, and both ends of the above lower and upper yokes are supported by the inner and outer crash stops 14, 16. O-ring damper 2 of outer crash stop 14 is made of compressible gum which is strongly compressed by the corresponding portion of actuator 10 when writing a servo track, whereby several tracks are concealed, which results in a drive not ready state. If the measurements of the O-ring dampers 2 are not uniform, the reliability of every drive is greatly deteriorated, and if the O-ring damper 2 is made of rigid material without compressibility, and when actuator 10 collides against outer crash stop 14, the entire impact force is applied to heads 32, whereby scratches and chopped marks can be formed on the surfaces of the disks, resulting in deterioration of the quality of disk drives. Further, inner crash stop 16 serves as a stopper holding heads 32 at the innermost limit over the disk surfaces and further plays the most important role of latching heads 32 under the power-off state to prevent heads 32 from being bounded into the data area by an external physical impact, but there is also a limit in increasing latching force, and it is also a problem that heads 32 are very sensitive to external impact.

Referring to FIGS. 2–6, actuator 10, according to the preferred embodiment of the present invention, is provided with a stopper 22 shaped like an reversed (backward) letter "C". Stopper 22 is attached to one side of actuator 10 adjacent to a pivot shaft 20 of actuator 10, and a stopper guide 24 is fixed base plate 30 so as to be engaged with stopper 22 to stop the rotation of actuator 10 when actuator 10 has been rotated about pivot shaft 20, thereby stopping heads 32 over the parking zone or preventing heads 32 from moving past the outer periphery of the disks, when heads 32 are seeking the parking zone or the first track on the disks.

Figure 4:
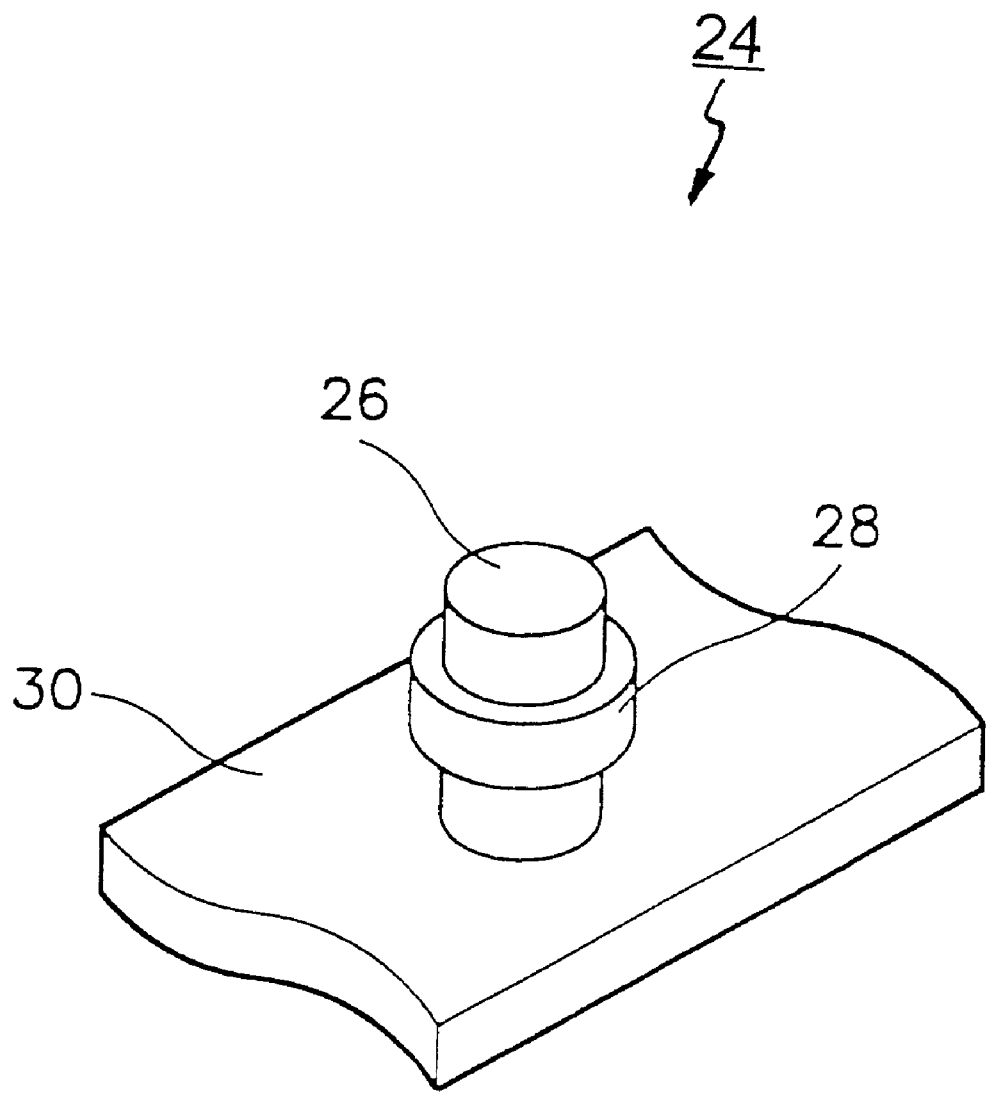
FIG. 4 is a perspective view for illustrating a stopper guide fixed on a base of the hard disk drive in order to be engaged with the stopper provided on the actuator, according to the preferred embodiment of the present invention.

As shown in FIG. 4, stopper guide pin 24 is provided with a stopper guide pin 26 fixed on base 30 at a predetermined distance from a pivot bearing 34 (FIG. 2) of actuator 10. Stopper guide pin 26 is provided with a ring 28 which contacts, at points A and B, hook shaped portions 22a and 22b of stopper 22, such that hooked shaped portions 22a and 22b of stopper 22 smoothly slide into contact with ring 28 as actuator 10 positions heads 32 over the parking zone on the disks, or as actuator 10 positions heads 32 adjacent to or over the first track on the disks. That is, when actuator 10 moves heads 32 over the data area, the stopper 22 moves without contacting ring 28 of stopper guide 24, and only when parking heads 32 or when seeking the first track as a reference position for writing servo data, does stopper 22 contact ring 28 of stopper guide 24. Stopper 22 can be formed integrally with the actuator arm or separately molded so as to be fixed to the actuator arm.

Figure 5:
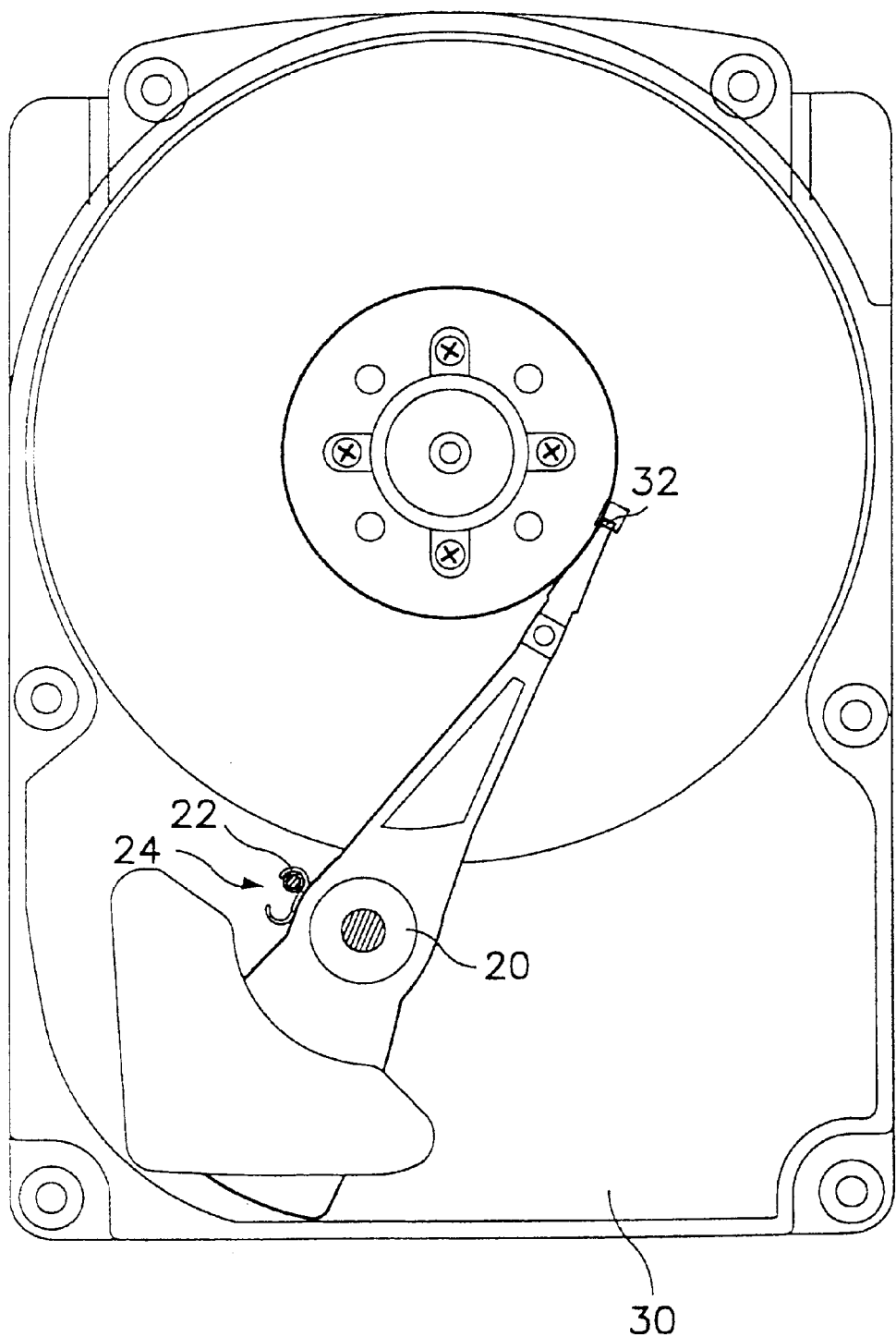
FIG. 5 is a descriptive diagram for illustrating the function of the stopper performing as inner crash stopper according to the preferred embodiment of the present invention.

Accordingly, when heads 32 are parked on the parking zone of the disks, hooked shaped portion 22a of stopper 22 hooks stopper guide 24 so as to stop actuator 10, thereby acting as an inner crash stopper, as shown in FIG. 5. Furthermore, since hooked shaped portion 22a of stopper 22 is shaped like a hook, such hooked shaped portion 22a can prevent actuator 10 and heads 32 from being moved beyond the inner limit by an external impact.

Figure 6:
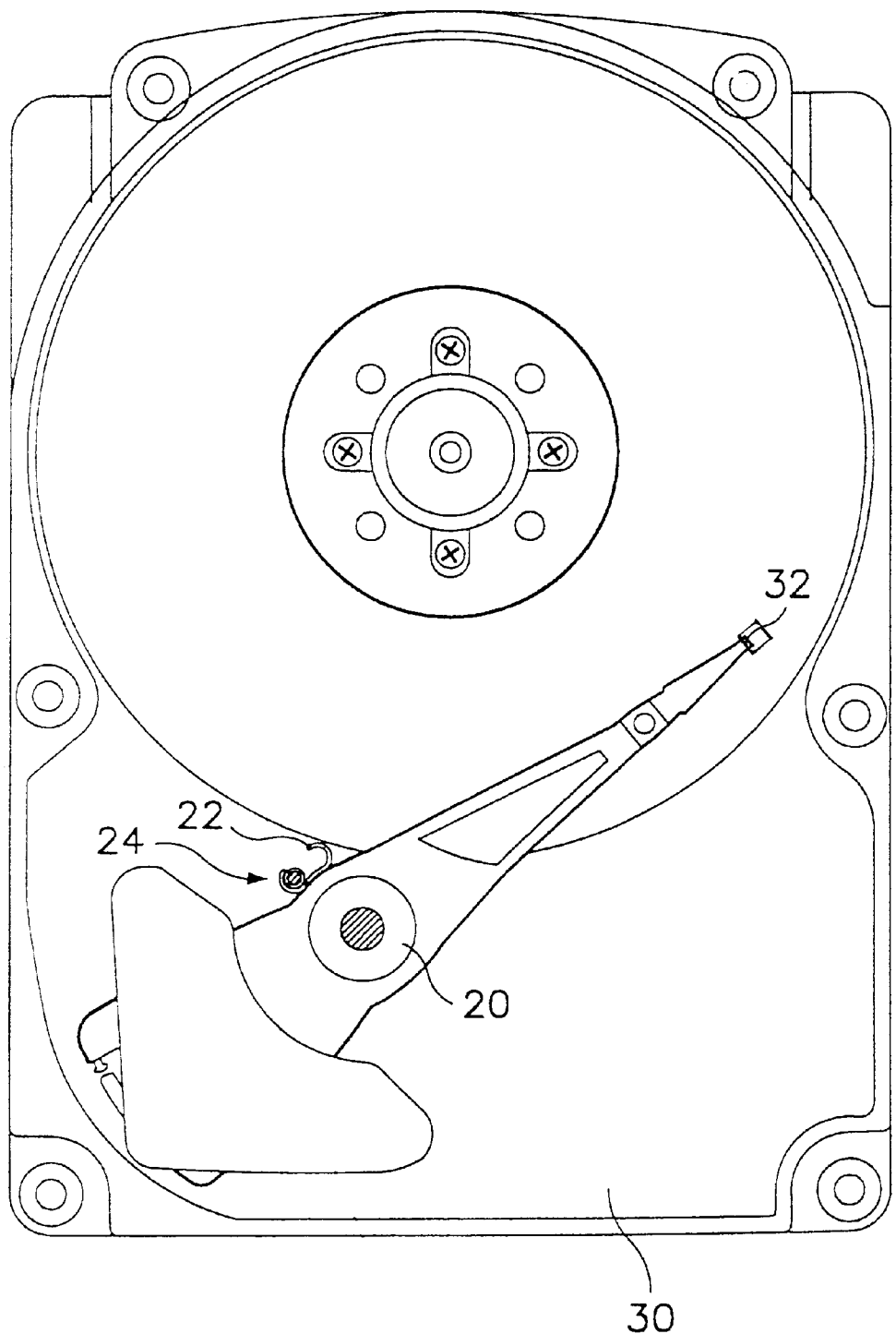
FIG. 6 is a descriptive diagram for illustrating the function of the stopper performing as an outer crash stopper according to the preferred embodiment of the present invention.

Also, referring to FIG. 6, when head 32 on actuator 10 is positioned on or adjacent to the outermost track, hooked shaped portion 22b of stopper 22b hooks stopper guide 24 so as to stop the actuator 10, thereby acting as an outer crash stopper.

The crash stopper arrangement as described with respect to FIG. 1 has crash stoppers 14, 16 positioned at a considerable distance from the pivot shaft of actuator 10, and accordingly, when the voice coil end of actuator 10 collides with the crash stoppers 14, 16, the impact force becomes stronger in proportion to the length between the pivot shaft and the contact point of the voice coil end of actuator 10, and the stronger impact force is applied to heads 32, thereby possibly causing the collision of heads 32 with disk surfaces to form scratches and chopped marks on the disk surfaces. The actuator stopper 22 of the present invention, however, is designed in such manner that stopper guide 24 is installed on base 30 in the vicinity of the central pivot shaft of actuator 10 as close as possible so that the distance between stopper 22 and stopper guide 24 can be minimized, thereby minimizing the impact force applied to heads 32 at the moment of collision of stopper 22 with stopper guide 24 when stopper 22 is hooked by stopper guide 24. Furthermore, stopper 22 as a backward "C" shape so as not to slip off stopper guide 24 when the hard drive is subjected to an external force.

As described above, the present invention has the advantage that the inventive mechanism doesn't employ a conventional parking zone latching system and accordingly needs not accessories such as a latch housing and latch pin, so that the number of attachments and the structural space can be decreased, and thus the production cost can be reduced. In addition, the colliding distance between the actuator and the stopper is minimized so as to reduce the impact force applied to the heads, thereby improving the reliability of the disk drive. Furthermore, the stopper is positioned close to the pivot shaft of the actuator, so that the positional error for writing servo data on the first track of every disk drive can be reduced.

What is claimed is:

1. An actuator crash stopper of a hard disk drive having a base for mounting components of said hard disk drive, comprising:

an actuator stopper positioned on one side of an actuator adjacent to a pivot of said actuator so as to act as an inner crash stopper and an outer crash stopper at both an inner limit and outer limit of a disk in said hard disk drive, thereby preventing said actuator from being rotated beyond said inner and outer limits; and a stopper guide vertically fixed on said base, said stopper guide being hooked by said actuator stopper when said actuator is rotated to said inner limit or said outer limit, said actuator stopper comprising:

a first hook shaped end portion for engaging with said stopper guide when a head is positioned over a parking zone of said disk, wherein said first hook shaped end portion hooks onto said stopper guide to prevent said head from slipping onto a data area of said disk, when said head is parked in said parking zone.

2. The actuator crash stopper as set forth in claim 1, wherein said actuator stopper is shaped like a reversed letter "C" for stopping said actuator from rotating past said inner or outer limits.

3. The actuator crash stopper as set forth in claim 1, wherein said actuator stopper further comprises a second hook shaped end portion for engaging with said stopper guide when said head is positioned near an outer periphery of said disk.

4. The actuator crash stopper as set forth in claim 1, wherein said stopper guide comprises a stopper guide pin extending vertically upwards from said base and a ring positioned over said stopper guide pin, said ring being engaged with said actuator stopper only when said actuator is rotated to either of said inner limit and said outer limit.

5. An actuator crash stopper of a hard disk drive having a base, a pivot connected to said base, an actuator rotatably mounted to said pivot and at least one read/write head mounted to one end of said actuator, said actuator crash stopper comprising:

a stopper fixed to one side of said actuator adjacent to said pivot, said stopper having a first hook shaped end and a second hook shaped end; and a stopper guide fixed to said base a predetermined distance from said pivot, said stopper guide contacting said stopper to be hooked by said first hook shaped end when said actuator is rotated about said pivot to position said at least one head in a parking zone of a disk in said hard disk drive, and said stopper guide contacting said stopper to be hooked by said second hook shaped end when said actuator is rotated about said pivot to position said at least one head adjacent to a first track of said disk, wherein said first hook shaped end portion hooks onto said stopper guide to prevent said at least one head from slipping onto a data area of said disk if an external force impacts said hard disk drive, when said at least one head is parked in said parking zone.

6. The actuator crash stopper as set forth in claim 5, wherein said stopper has a backward "C" shape.

7. The actuator crash stopper as set forth in claim 5, wherein said stopper guide comprises a stopper guide pin extending vertically upwards from said base and a ring positioned over said stopper guide pin, wherein said ring contacts said stopper only when said actuator is rotated about said pivot to position said at least one head in said parking zone and to position said at least one head adjacent to said first track.

8. The actuator crash stopper as set forth in claim 7, wherein said second hook shaped end portion hooks onto said ring of said stopper guide to prevent said at least one head from slipping past an outer periphery of said disk if an external force impacts said hard disk drive, when said at least one head is positioned near said first track.

9. An actuator crash stopper of a hard disk drive having a base for mounting components of said hard disk drive, comprising:

a single actuator stopper fixed to one side of an actuator arm adjacent to a pivot of said actuator arm, said actuator stopper forming an inner crash stopper and an outer crash stopper at both an inner limit and outer limit of a disk in said hard disk drive to prevent a head mounted on a distal end of said actuator arm from being rotated beyond said inner and outer limits; and a stopper guide vertically fixed on said base, said stopper guide being seized by said actuator stopper when said actuator is rotated to either of said inner limit and said outer limit, said actuator stopper comprising:

a first hooked end portion for hooking said stopper guide when said head is positioned over a parking zone of said disk, wherein said first hooked end portion prevents said head from slipping onto a data area of said disk if an external force impacts said hard disk drive, when said head is parked in said parking zone; and a second hooked end portion for hooking said stopper guide when said head is positioned near an outer periphery of said disk.

10. The actuator crash stopper as set forth in claim 9, wherein said second hooked end portion prevents said head from slipping past an outer periphery of said disk if an external force impacts said hard disk drive, when said head is positioned near said outer periphery.

11. The actuator crash stopper as set forth in claim 9, wherein said stopper has a "C" shape to prevent said stopper from slipping off said stopper guide if an external force impacts said hard disk drive.

12. The actuator crash stopper as set forth in claim 9, wherein said stopper guide comprises a stopper guide pin extending vertically upwards from said base and a ring positioned over said stopper guide pin, said ring being seized by said actuator stopper only when said actuator is rotated to either of said inner limit and said outer limit.

13. The actuator crash stopper as set forth in claim 12, wherein said stopper has a "C" shape to prevent said stopper from slipping off said ring if an external force impacts said hard disk drive.

* * * * *